US006845996B2

(12) United States Patent
Cheng

(10) Patent No.: US 6,845,996 B2
(45) Date of Patent: Jan. 25, 2005

(54) SHOCK ABSORBER FOR A POWER WHEELCHAIR

(75) Inventor: Ming-Chuan Cheng, Taichung (TW)

(73) Assignee: Merits Health Products Co., Ltd., Taichung (TW)

(*) Notice: Subject to any disclaimer, the term of this patent is extended or adjusted under 35 U.S.C. 154(b) by 156 days.

(21) Appl. No.: 10/378,646

(22) Filed: Mar. 5, 2003

(65) Prior Publication Data

US 2004/0173983 A1 Sep. 9, 2004

(51) Int. Cl.[7] .......... B60G 11/14
(52) U.S. Cl. .......... 280/124.179; 280/124.1; 180/907
(58) Field of Search .......... 280/124.1, 124.179, 280/250.1; 180/907

(56) References Cited

U.S. PATENT DOCUMENTS 2,026,909 A * 1/1936 Nallinger .......... 267/289
4,573,703 A * 3/1986 Linger .......... 280/124.145
5,685,555 A * 11/1997 McCormick et al. .......... 280/6.157
5,899,475 A * 5/1999 Verhaeg et al. .......... 280/250.1
6,199,647 B1 * 3/2001 Schaffner et al. .......... 180/65.1

FOREIGN PATENT DOCUMENTS

JP 2002-301114 A * 10/2002

* cited by examiner

*Primary Examiner*—Ruth Ilan
(74) *Attorney, Agent, or Firm*—Rosenberg, Klein & Lee

(57) ABSTRACT

A shock absorber is installed in a power wheelchair to absorb shocks transmitted from rear wheels of the power wheelchair. The shock absorber includes a bracket, a seat and a suspension device. The suspension device is installed between the bracket and the seat and includes two suspension springs. Each suspension spring has a different spring stiffness. The seat is pivotally connected to the bracket at a pivot point between the two suspension springs. Consequently, the suspension springs will balance absorbing shocks caused by bumps while the power wheelchair is moving.

3 Claims, 5 Drawing Sheets

SHOCK ABSORBER FOR A POWER WHEELCHAIR

BACKGROUND OF THE INVENTION

1. Field of the Invention

The present invention relates to a shock absorber, and more particularly to a shock absorber for a power wheelchair that is suitable for people who are handicapped, elderly or suffering from a disease.

2. Description of Related Art

Wheelchairs were developed for the people who are unable to walk but are otherwise mobile. A power wheelchair is driven by electrical power and is really helpful and convenient to aid people to move about. Power wheelchairs are subjected to shocks when traveling on rough surfaces or bumps on a surface. Shocks cause people sitting in power wheelchairs to feel uncomfortable when the power wheelchairs are moving.

With reference to FIGS. 4 and 5, two conventional shock absorbers (60) are mounted in a power wheelchair (50) to reduce the shock transmitted to a person sitting in the wheelchair (50). The power wheelchair (50) has a pair of front wheels (51), a pair of rear wheels (52) and a power drive assembly (53). The power drive assembly (53) has a drive shaft (531) with two ends (not shown). The ends of the drive shaft (531) respectively extend out of the power drive assembly (53) and are attached to the rear wheels (52). The power drive assembly (53) rotates the rear wheels (52) to move the power wheelchair (50) on a surface.

A conventional shock absorber (60) is mounted on the power wheelchair (50) over the drive shaft (531) near each rear wheel (52) and comprises a suspension spring (61) with a spring stiffness and a suspension rod (62). The suspension spring (61) is mounted around the suspension rod (62). The suspension rod (62) is moveably mounted in the power wheelchair (50) over the drive shaft (531) to move upward when a shock is imparted to the rear wheel (52), and the suspension spring (61) compresses to absorb the shock. While the power wheelchair (50) is moving on a rough or bumpy surface, shocks to the rear wheels (52) will be transmitted to and absorbed by the conventional shock absorbers (60).

However, a conventional shock absorber (60) only has one suspension spring (61) to absorb shocks transmitted from the rear wheel (51). Often, one suspension spring (61) is inadequate to completely absorb the shocks. The shocks will still be transmitted to the power wheelchair (50) where a person is sitting. The suspension spring (61) of the conventional shock absorber (60) compresses to absorb the shocks. However, the compression of the suspension spring (61) creates a restitution force in the suspension spring (61). A sudden shock causes a sudden compression of the suspension spring (61) that generates a sudden restitution force in the suspension spring (61). The restitution force in the spring (61) will immediately be transmitted to the power wheelchair (50) and causes a recoil response in the power wheelchair (50). The person sitting in the power wheelchair (50) will feel uncomfortable.

Furthermore, the suspension spring (61) may be completely compressed by a very heavy person sitting in the power wheelchair (50). With the suspension spring (61) completely compressed, the conventional shock absorber (60) will not be able to absorb any shock because any additional compression of the suspension spring (61) is impossible. In such a state, the convention shock absorber (60) has lost its original capability of absorbing shock.

To overcome the shortcomings, the present invention provides a shock absorber for a power wheelchair to mitigate or obviate the aforementioned problems.

SUMMARY OF THE INVENTION

The main objective of the invention is to provide a shock absorber for a power wheelchair that provides two suspension springs to efficiently balance absorbing shocks caused by surface bumps while the power wheelchair is moving.

Another objective of the invention is to provide a shock absorber for a power wheelchair that provides two suspension springs to adequately support a heavy person sitting in the power wheelchair to prevent the suspension springs from being completely compressed by the weight of the person.

Other objectives, advantages and novel features of the invention will become more apparent from the following detailed description when taken in conjunction with the accompanying drawings.

DETAILED DESCRIPTION OF PREFERRED EMBODIMENT

Figure 1:
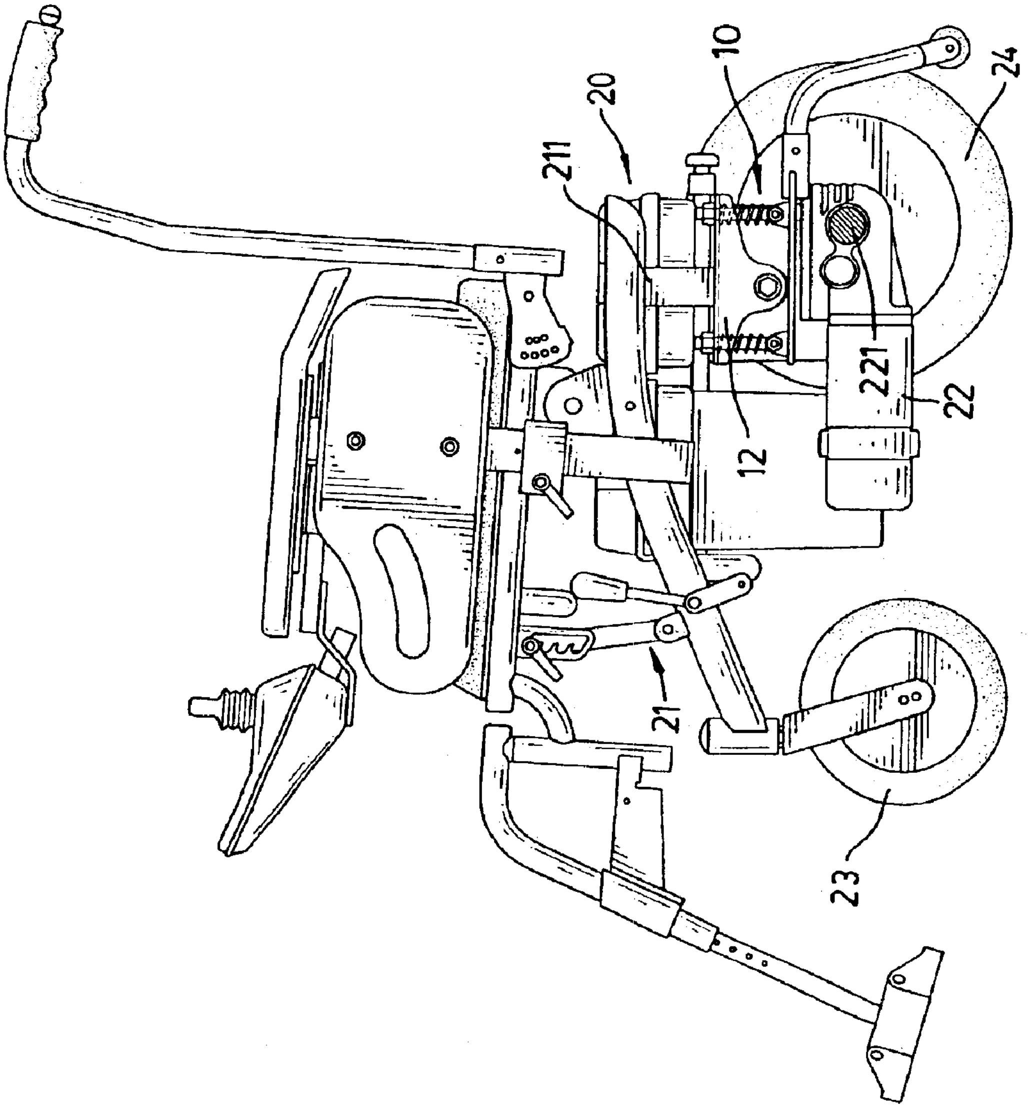
FIG. 1 is a side plan view in partial section of a power wheelchair with shock absorbers in accordance with the present invention.

With reference to FIG. 1, a power wheelchair (20) generally has a frame (21), an electrical drive assembly (22), a pair of front wheels (23) and a pair of rear wheels (24). The frame (21) has a front (not numbered), a rear (not numbered) and two opposite side (not numbered). Each front wheel (23) is rotatably mounted on the front at each side of the frame (21). A connecting rod (211) with a bottom end (not numbered) is attached to the frame (21) near the rear at each side of the frame (21).

The electrical drive assembly (22) has two opposite sides (not numbered) and a drive shaft (221) with two ends (not numbered). The electrical drive assembly (22) is mounted on the frame (21) near the rear. The ends of the drive shaft (221) respectively extend out of the electrical drive assembly (22) at the sides of the electrical drive assembly (22). The rear wheels (24) are attached respectively to the ends of the drive shaft (221) such that the electrical drive assembly (22) can rotate the rear wheels (23) and move the power wheelchair (20) on a surface.

Figure 2:
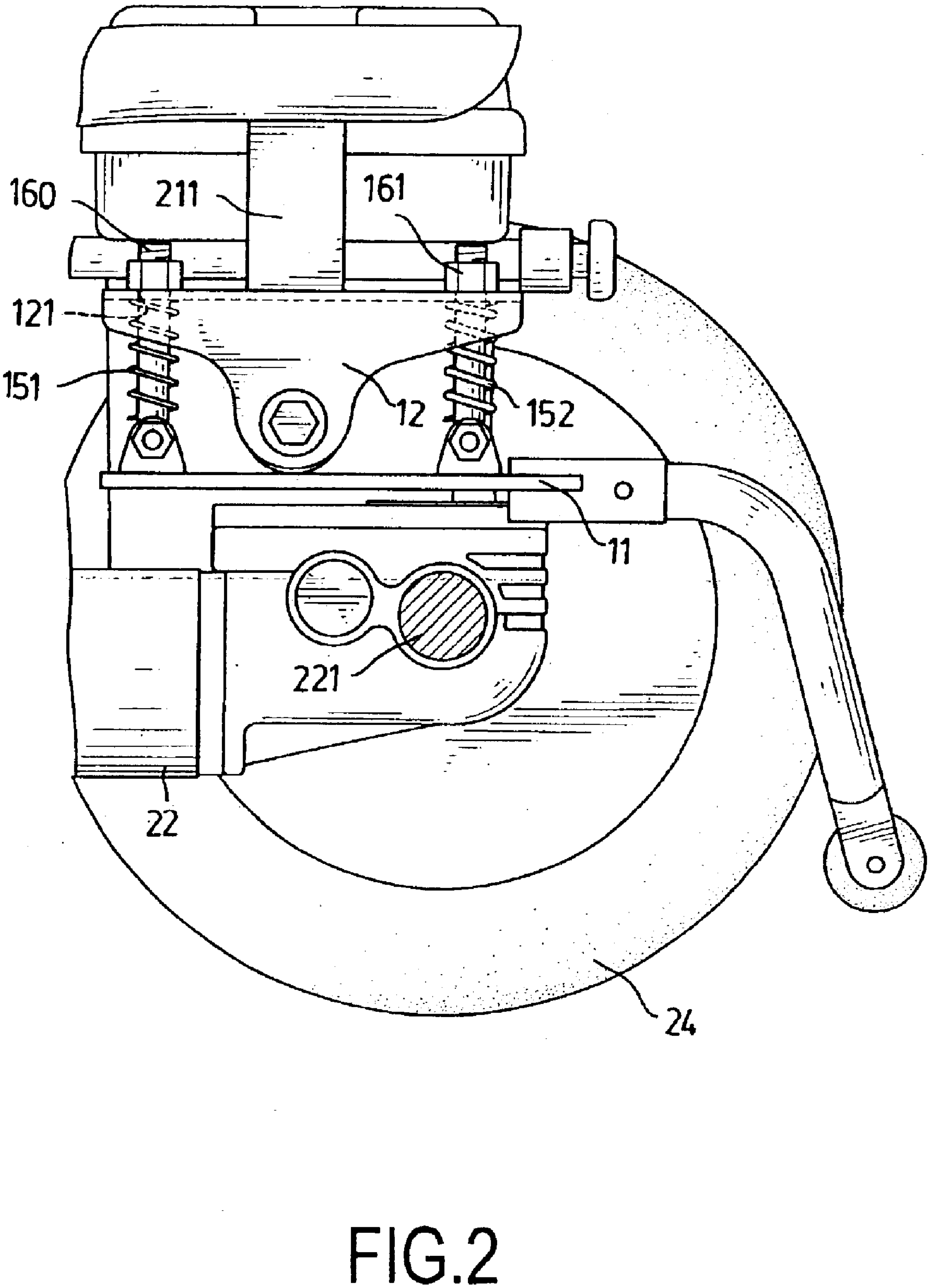
FIG. 2 is an enlarged side plan view in partial section of one shock absorber in FIG. 1.
Figure 3:
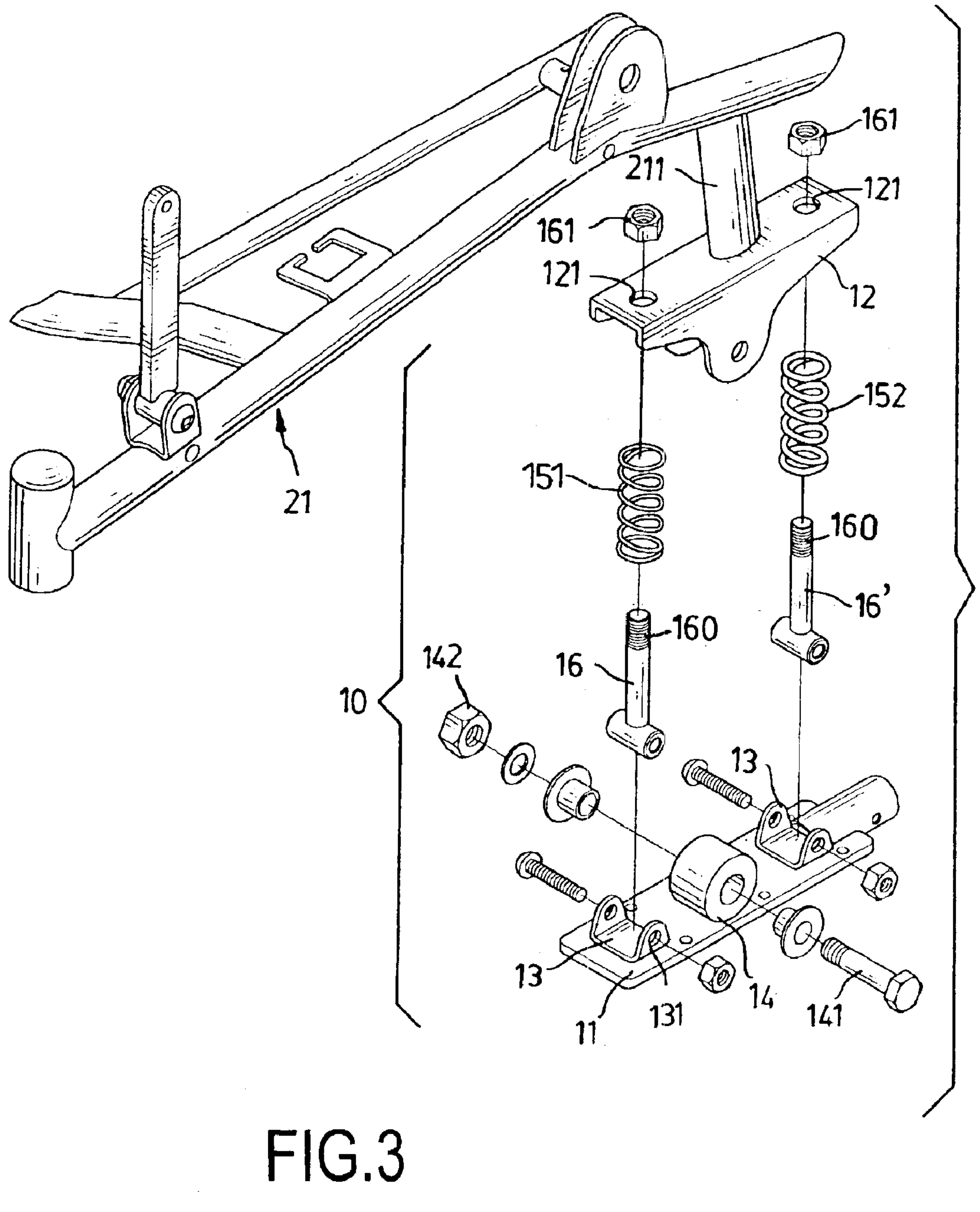
FIG. 3 is an exploded perspective view of the shock absorber in FIG. 2.
Figure 4:
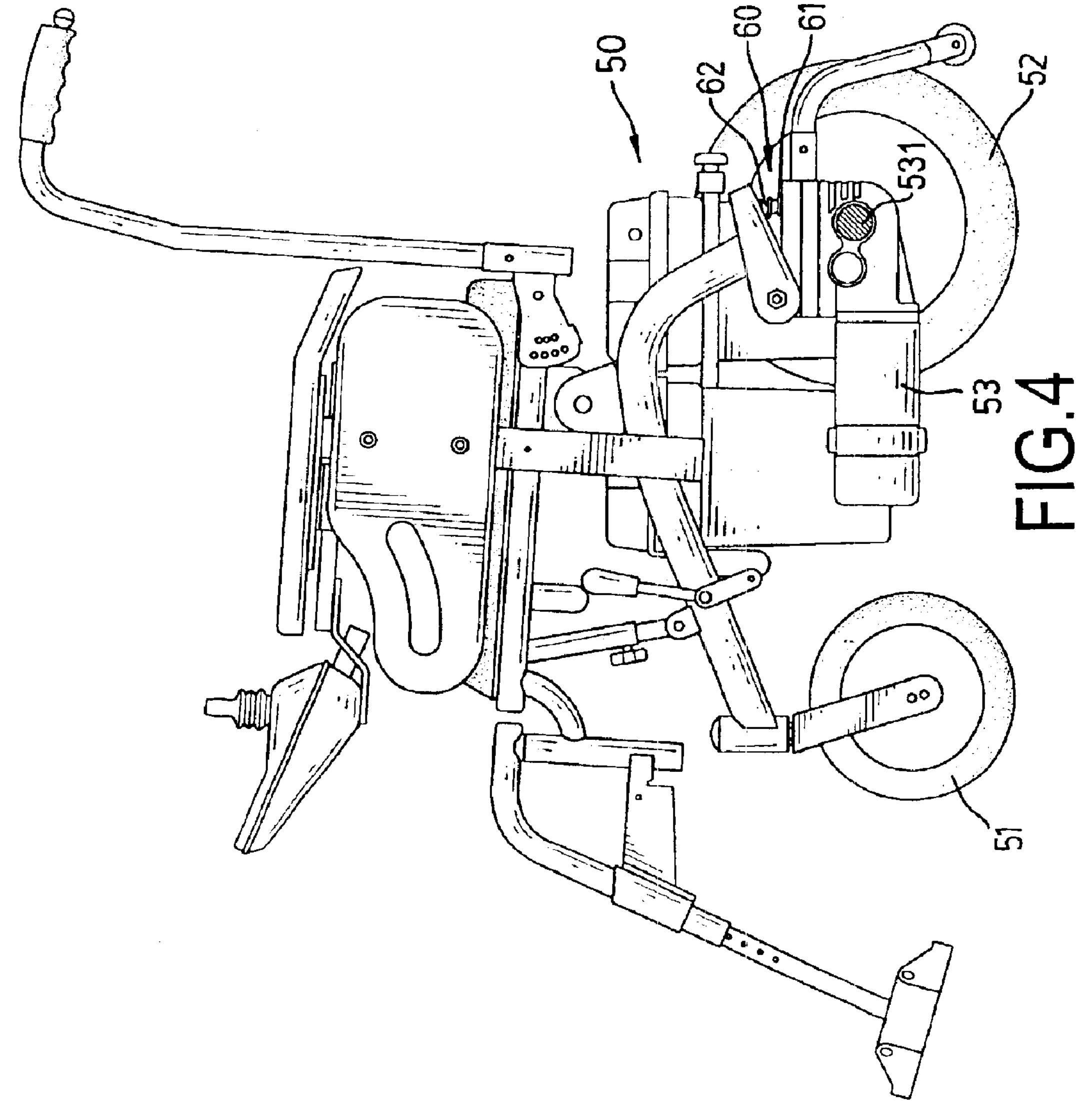
FIG.4 PRIOR ART
FIG. 4 is a side plan view in partial section of a power wheelchair with two conventional shock absorbers in accordance with the prior art.
Figure 5:
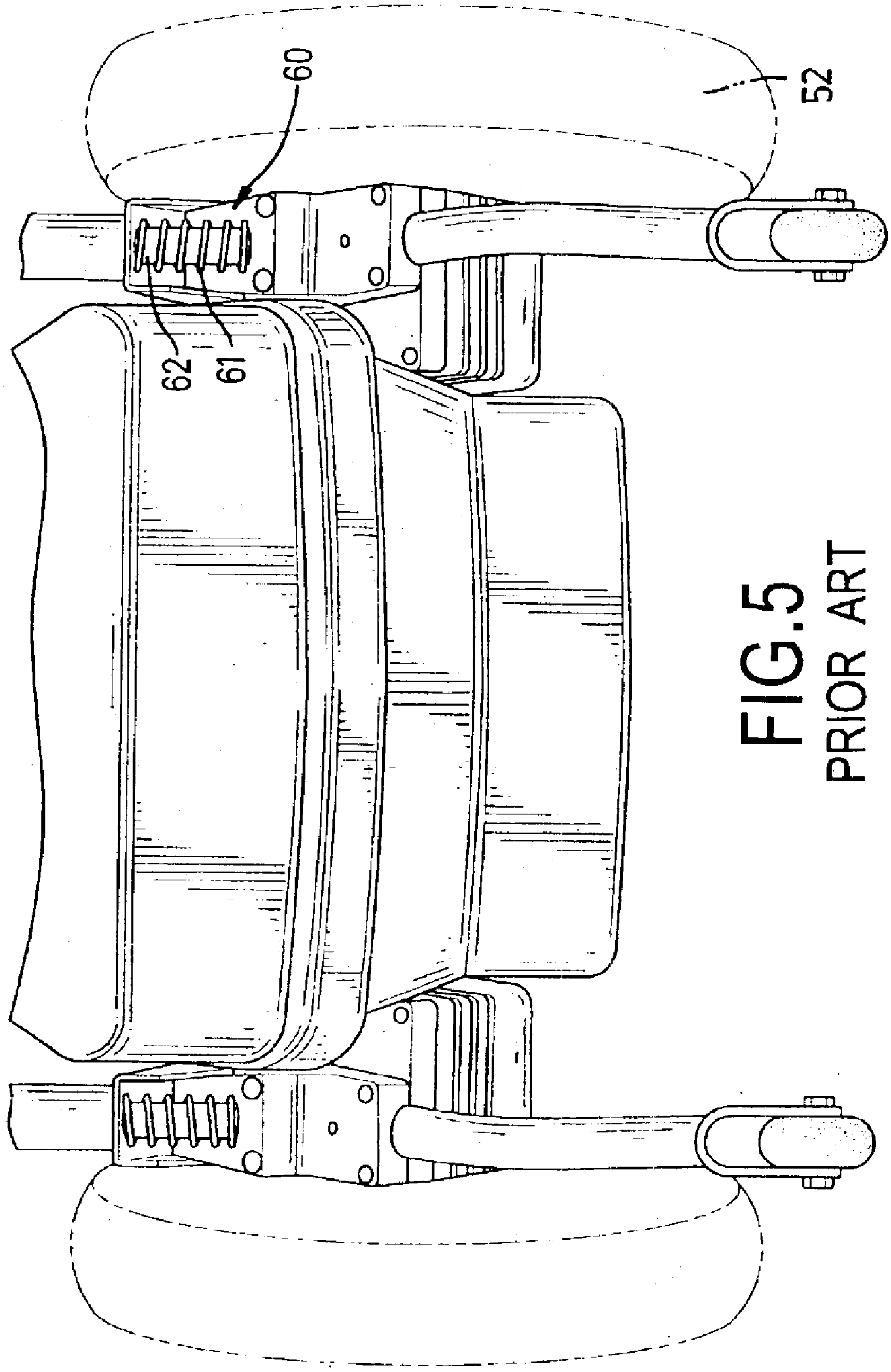
FIG.5 PRIOR ART
FIG. 5 is an enlarged rear plan view of the conventional shock absorbers in FIG. 4. on a power wheelchair.

A shock absorber (10) is connected between the bottom end of each connecting rod (211) and the electrical drive assembly (22) near the rear at each side of the frame (21). With further reference to FIGS. 2 and 3, each shock absorber (10) for a power wheelchair (20) comprises a seat (not numbered), a bracket (12) and a suspension device (not numbered). The seat has a base (11), two pivot brackets (13) and a connecting ring (14) and is mounted directly under the bracket (12). The base (11) is adapted to attach to the electrical drive assembly (22). The base (11) has a top (not numbered), a front end (not numbered) and a rear end (not numbered). The pivot brackets (13) are attached to the top of the base (11) near the front and rear ends of the base (11), respectively. Each pivot bracket (13) has two sides and parallel wings (not numbered) extending perpendicular up from the top of the base (11) at the sides, respectively. Each wing has an aligned pivot hole (131). The connecting ring (14) is securely attached to the top of the base (11) equidistance between the two pivot brackets (13). The connecting ring (14) has a through hole (not numbered) defined across the base (11).

The bracket (12) has a top (not numbered), a bottom (not numbered), a front end (not numbered), a rear end (not numbered) and two opposite sides (not numbered). The top of the bracket (12) is adapted to attach to the bottom end of one of the connecting rods (211) on the frame (21). Two through holes (121) are defined through the top of the bracket (12) respectively corresponding to the pivot brackets (13) on the base (11). A lobe (not numbered) with a central transverse hole (not numbered) is formed on each side and extends down from the bottom of the bracket (12) corresponding to the connecting ring (14). The transverse holes in the lobes are aligned with the through hole in the connecting ring (14).

The suspension device is mounted between the bottom of the bracket (12) and the top of the base (11) and comprises a front suspension spring (151), a rear suspension spring (152), a front suspension rod (16) and a rear suspension rod (16'). The front and rear suspension springs (151, 152) have different spring stiffnesses, and the spring stiffness of the front suspension spring (151) is less than the spring stiffness of the rear suspension spring (152). Each of the suspension rods (16, 16') has a top end (not numbered), a bottom end (not numbered) and a transverse tubular connector (not numbered) and is pivotally mounted in a corresponding pivot bracket (13) on the base (11). Each transverse tubular connector has a pivot hole (not numbered) and is attached to the bottom end of each of the suspension rods (16, 16'). An external thread (160) is defined around the top end of each of the suspension rods (16, 16').

The transverse tubular connector at the bottom end of each of the suspension rods (16, 16') is pivotally mounted between the two wings (131) of a corresponding one of the pivot brackets (13) by means of a fastener, such as a bolt (not numbered) and a nut (not numbered). The pivot holes in the transverse tubular connector and the wings (131) are aligned. The bolt has an enlarged end (not numbered) and a threaded end (not numbered), and the threaded end of the bolt passes through the pivot holes and extends out of the pivot hole in one wing (131). The nut is screwed onto and holds the bolt in place.

Both the suspension springs (151, 152) respectively have a top end (not numbered) and a bottom end (not numbered). The front suspension spring (151) is mounted around the front suspension rod (16) that is mounted near the front end of the base (11). The rear suspension spring (152) is mounted around the rear suspension rod (16') that is mounted near the rear end of the base (11). The external threaded top ends of the suspension rods (16, 16') respectively pass through and extend out of the through holes (121) in the bracket (12), and a nut (161) is screwed onto each threaded top end of the suspension rods (16, 16') on the top of the bracket (12). A bolt (141) with an enlarged end (not numbered) and a threaded end (not numbered) passes through the transverse holes in the lobes and the through hole in the connecting ring (14). The threaded end of the bolt (141) extends out of the transverse hole of one lobe, and a nut (142) screws onto and holds the threaded end of the bolt (141). Thereafter, the base (11) is pivotally connected to the bracket (12).

Therefore, the top ends of the two suspension springs (151, 152) respectively abut the bottom of the bracket (12), and the bottoms of the two suspension springs (151, 152) respectively abut the transverse tubular connectors on the bottom ends of the suspension rods (16, 16'). Shocks due to rough or bumpy surfaces will be transmitted to the base (11). Both suspension springs (151, 152) are compressed and deformed to absorb or dissipate the shocks. However, only one of the two suspension springs (151, 152) will be compressed at a time because the base (11) is pivotally connected to the bracket (12). The compression of each of the front and rear suspension springs (151, 152) will develop a restitution force in the each respective one of the two suspension springs (151, 152). Suppose the rear suspension spring (152) is compressed and a restitution force is developed in the rear suspension spring (152). The restitution force causes a recoil response that acts on both the base (11) and the bracket (12) which pushes the rear end of the base (11) away from the bracket (12). The front end of the base (11) is pivoted simultaneously toward the bracket (12), which compresses the front suspension spring (151). The compression of the front suspension spring (151) will create a restitution force to oppose the recoil response of the rear suspension spring (152) to diminish the sudden recoil response of the rear suspension spring (152). Likewise, when the front suspension spring (151) is compressed by a shock, the recoil response in the front suspension spring (151) will also be diminished. Consequently, the shock absorber (10) will reduce the recoil response caused by each of the suspension springs (151, 152), which reduces the effect on the wheelchair (20).

Otherwise, when a heavy person sits on the power wheelchair (20), the weight of the heavy person will compress both the front and the rear suspension springs (151, 152). Since the spring stiffness of the front suspension spring (151) is less than that of the rear suspension spring (152), deformation of the front suspension spring (151) will be greater than that of the rear suspension spring (152). In such a state, the rear suspension spring (152) still can be compressed to absorb the shocks. Moreover, the user can tighten or loosen the nuts (161) to adjust deformations of the suspension springs (151, 152). The adjustment of the suspension springs (151, 152) will change each suspension springs' (151, 152) ability to absorb shocks. Therefore, the shock absorber will accommodate various users who may be heavy, standard weight or light.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A shock absorber for a power wheelchair having a frame, an electrical drive assembly and a pair of rear wheels, where the electrical drive assembly is mounted in the frame and has a drive shaft with two ends respectively extending out of the electrical drive assembly, and the rear wheels are respectively attached to and driven by the ends of the drive shaft; the shock absorber comprising a seat having a base with a top, a front end and a rear end and adapted to couple to the electrical drive assembly;

a pivot bracket respectively attached to the top near each of the front and the rear of the base; and a connecting ring secured on the top of the base between the two pivot brackets;

a bracket pivotally connected to the connecting ring on the base to pivotally connect the base to the bracket and having a top, a bottom, a front end, a rear end and two opposite sides, the top of the bracket adapted to attach to the frame of the power wheelchair and the bracket further having two through holes respectively defined through the top of the bracket and corresponding to the pivot brackets on the base; and a suspension device mounted between the bottom of the bracket and the top of the base and the suspension device comprising a front suspension rod pivotally mounted in one of the pivot brackets near the front end of the base and having a top end and a bottom end, the bottom end of the front suspension rod pivotally mounted in the pivot bracket and the top end of the front suspension rod extending out of a corresponding one of the through holes in the bracket to be fastened at the top of the bracket;

a rear suspension rod pivotally mounted in one of the pivot brackets near the rear end of the base and having a top end and a bottom end, the bottom end of the rear suspension rod pivotally mounted in the pivot bracket and the top end of the rear suspension rod extending out of a corresponding one of the through holes in the bracket to be fastened at the top of the bracket;

a front suspension spring mounted around the front suspension rod and having a spring stiffness, a top end and a bottom end supported on the bottom end of the front suspension rod; and a rear suspension spring mounted around the rear suspension rod and having a spring stiffness, a top end and a bottom end supported on the bottom end of the rear suspension rod;

wherein the spring stiffness of the front suspension spring is less than the spring stiffness of the rear suspension spring.

2. The shock absorber as claimed in claim 1, wherein the shock absorber further has a through hole defined through the connecting ring across the base;

a lobe with an aligned transverse hole defined in the bottom at each side between the front end and the rear end of the bracket and corresponding to the connecting ring on the top of the base, and the transverse holes of the lobes aligned with the through hole in the connecting ring;

a bolt having an enlarged end and a threaded end mounted in the through hole in the connecting ring and the transverse holes in the lobes, the treaded end of the bolt passing through the through hole in the connecting ring and the transverse holes in the lobes and extending out of the transverse hole in one lobe; and a nut screwed onto and holding the threaded end of the bolt such that the base is pivotally connected to the bracket.

3. The shock absorber as claimed in claim 2, wherein each pivot bracket has two opposite sides and two parallel wings respectively formed perpendicular to the top of the base at the sides, an aligned pivot hole is defined in each wing; and the suspension device further comprises a transverse tubular connector attached to the bottom end of each of the front and the rear suspension rods and pivotally mounted between the wings of each pivot bracket;

an external thread defined around the top end of each of the front and the rear suspension rods, and a nut screwed to the external thread on each of the front and the rear suspension rods at the top of the bracket to hold each of the front and the rear suspension rods;

where the top ends of the front and the rear suspension springs respectively abut the bottom of the bracket and the bottom ends of each of the front and rear suspension springs abut the transverse tubular connector.

* * * * *